US005841955A

United States Patent [19]

Wang

[11] Patent Number: 5,841,955

[45] Date of Patent: Nov. 24, 1998

[54] CONTROL SYSTEM FOR A PRINTING PRESS

[75] Inventor: Xin xin Wang, Woodridge, Ill.

[73] Assignee: Goss Graphic Systems, Inc., Westmont, Ill.

[21] Appl. No.: 515,550

[22] Filed: Aug. 16, 1995

Related U.S. Application Data

[63] Continuation-in-part of Ser. No. 265,701, Jun. 24, 1994, abandoned, and a continuation of Ser. No. 800,947, Dec. 2, 1991, abandoned.

[51] Int. Cl.[6] .......................... G06K 15/00; B41F 33/00

[52] U.S. Cl. .......................... 395/109; 395/104; 101/365; 101/366; 347/5; 347/6; 347/19

[58] Field of Search .......................... 395/109, 104, 395/101; 101/211, 483, 484, 470, 471, 365, 170, DIG. 45, DIG. 49, 366, 181, 183; 358/504, 505, 512, 518, 503, 515; 250/316.1, 317.1, 318, 319, 580, 582–584; 364/526, 402, 551.01, 558; 347/6, 19, 5, 15, 43

[56] References Cited

U.S. PATENT DOCUMENTS

| | | | |
|---|---|---|---|
| 2,968,988 | 1/1961 | Crosfield | 88/14 |
| 3,612,753 | 10/1971 | Korman | 178/5.2 A |
| 3,806,633 | 4/1974 | Coleman | 178/5.2 R |
| 3,958,509 | 5/1976 | Murray et al. | 101/426 |
| 4,472,736 | 9/1984 | Ushio et al. | 358/75 |
| 4,481,532 | 11/1984 | Clark et al. | 358/80 |
| 4,482,917 | 11/1984 | Gaulke et al. | 358/80 |
| 4,494,875 | 1/1985 | Schramm et al. | 356/402 |
| 4,505,589 | 3/1985 | Ott et al. | 356/402 |
| 4,539,647 | 9/1985 | Kaneko et al. | 364/526 |
| 4,561,103 | 12/1985 | Horiguchi et al. | 382/1 |
| 4,564,859 | 1/1986 | Knop et al. | 358/75 |
| 4,583,186 | 4/1986 | Davis et al. | 364/526 |
| 4,590,515 | 5/1986 | Wellendorf | 358/75 |
| 4,631,578 | 12/1986 | Sasaki et al. | 358/80 |
| 4,631,579 | 12/1986 | Hoffrichter et al. | 358/80 |
| 4,643,563 | 2/1987 | Sayanagi | 355/77 |
| 4,649,500 | 3/1987 | Yamada et al. | 364/518 |
| 4,649,502 | 3/1987 | Keller et al. | 364/519 |
| 4,666,307 | 5/1987 | Matsumoto et al. | 356/404 |
| 4,667,227 | 5/1987 | Ikeda | 358/75 |
| 4,685,139 | 8/1987 | Masuda et al. | 382/1 |
| 4,713,684 | 12/1987 | Kawamura et al. | 358/530 |
| 4,752,822 | 6/1988 | Kawamura | 358/523 |

(List continued on next page.)

FOREIGN PATENT DOCUMENTS

| | | |
|---|---|---|
| 0 142 470 B1 | 10/1984 | European Pat. Off. . |
| 0 601 259 A1 | 12/1992 | European Pat. Off. . |
| 35 33 549 | 10/1986 | Germany . |
| 40 23 320 | 1/1992 | Germany . |
| 60-115820 | of 0000 | Japan . |
| 2-110566 | 4/1990 | Japan . |
| 649 842 | 6/1985 | Sweden . |

OTHER PUBLICATIONS

Graphic Microsystems, Inc., Advertisment for Autosmart™ Software.

Graphic Microsystems, Inc., *Autosmart II Version 10.0 User's Manual*, pp. 1–2.

Heidelberg, *Technical Series . . . 2 Stop Guessing About Color.*

*Primary Examiner*—Dwayne Bost
*Assistant Examiner*—Tracy M. Legree
*Attorney, Agent, or Firm*—Marshall, O'Toole, Gerstein, Murray & Borun

[57] ABSTRACT

A control system (10) for a four-color printing press (11) having a device (21) for detecting the energy reflected from a paper surface in both the visible region and the infrared region of the electromagnetic spectrum, a device (23) for converting the output of the detecting device (21) to a set of variables which represent the amount of ink presented on the paper for any of the cyan, magenta, yellow, and black inks, and a device (25) responsive to the converting device (23) for adjusting the four-color printing press (11) to maintain the color consistency with or without an additional color control target.

34 Claims, 12 Drawing Sheets

U.S. PATENT DOCUMENTS 4,758,885 7/1988 Sasaki et al. .......... 358/520
4,790,022 12/1988 Dennis .......... 382/8
4,794,382 12/1988 Lai et al. .......... 340/703
4,794,648 12/1988 Ayata et al. .......... 382/8
4,802,107 1/1989 Yamamoto et al. .......... 364/525
4,830,501 5/1989 Terashita .......... 356/402
4,837,711 6/1989 Suzuki .......... 364/523
4,839,719 6/1989 Hirota et al. .......... 38/75
4,839,721 6/1989 Abdulwahab et al. .......... 358/80
4,855,765 8/1989 Suzuki et al. .......... 346/154
4,879,594 11/1989 Stansfield et al. .......... 358/80
4,884,130 11/1989 Huntsman .......... 358/80
4,899,214 2/1990 Robbins et al. .......... 358/75
4,908,712 3/1990 Uchiyama et al. .......... 358/298
4,910,593 3/1990 Weil .......... 358/113
4,926,254 5/1990 Nakatsuka et al. .......... 358/527
4,941,038 7/1990 Walowit .......... 358/80
4,947,348 8/1990 Van Arsdell .......... 364/523
4,949,284 8/1990 Watanabe .......... 364/520
4,956,703 9/1990 Uzuda et al. .......... 358/76
4,958,221 9/1990 Tsuboi et al. .......... 358/80
4,959,790 9/1990 Morgan .......... 364/518
4,962,421 10/1990 Murai .......... 358/76
4,967,264 10/1990 Parulski et al. .......... 358/500
4,967,379 10/1990 Ott .......... 364/526
4,970,584 11/1990 Sato et al. .......... 358/75
4,975,769 12/1990 Aizu et al. .......... 358/80
4,975,862 12/1990 Keller et al. .......... 364/526
4,977,448 12/1990 Murata et al. .......... 358/75
5,003,494 3/1991 Ng .......... 364/519
5,018,008 5/1991 Asada .......... 358/78
5,029,107 7/1991 Lee .......... 364/518
5,045,937 9/1991 Myrick .......... 358/109
5,047,842 9/1991 Bouman, Jr. et al. .......... 358/75
5,053,866 10/1991 Johnson .......... 358/75
5,068,810 11/1991 Ott .......... 364/526
5,081,527 1/1992 Naito .......... 358/75
5,084,758 1/1992 Danzuka et al. .......... 358/296
5,087,126 2/1992 Pochieh .......... 356/402
5,089,977 2/1992 Pflästerer et al. .......... 364/526
5,101,448 3/1992 Kawachiya et al. .......... 382/61
5,105,466 4/1992 Tsujiuchi et al. .......... 382/1
5,107,332 4/1992 Chan .......... 358/80
5,120,624 6/1992 Takanashi et al. .......... 430/47
5,121,196 6/1992 Hung .......... 358/75
5,122,977 6/1992 Pfeiffer .......... 364/551
5,126,839 6/1992 Sugiura .......... 358/80
5,128,748 7/1992 Murakami et al. .......... 358/75
5,130,935 7/1992 Takiguchi .......... 364/526
5,142,356 8/1992 Usami et al. .......... 358/80
5,148,288 9/1992 Hannah .......... 358/298
5,157,483 10/1992 Shoji et al. .......... 358/75
5,157,506 10/1992 Hannah .......... 358/298
5,162,899 11/1992 Naka et al. .......... 358/80
5,163,012 11/1992 Wuhrl et al. .......... 364/552
5,166,755 11/1992 Gat .......... 356/419
5,166,789 11/1992 Myrick .......... 358/109
5,170,441 12/1992 Minura et al. .......... 382/45
5,172,224 12/1992 Collette et al. .......... 358/80
5,175,772 12/1992 Kahn et al. .......... 382/1
5,181,081 1/1993 Suhan .......... 356/394
5,181,257 1/1993 Steiner et al. .......... 382/571
5,182,721 1/1993 Kipphan et al. .......... 364/526
5,191,361 3/1993 Abe .......... 346/157
5,200,817 4/1993 Birnbaum .......... 358/80
5,206,707 4/1993 Ott .......... 356/402
5,216,498 6/1993 Matsunawa et al. .......... 358/75
5,244,421 9/1993 Doherty .......... 101/211
5,283,671 2/1994 Stewart et al. .......... 358/532
5,299,034 3/1994 Kanno et al. .......... 358/518
5,302,833 4/1994 Hamar et al. .......... 250/561
5,317,425 5/1994 Spence et al. .......... 358/504
5,345,320 9/1994 Hirota .......... 358/518
5,357,448 10/1994 Stanford .......... 364/526
5,363,318 11/1994 McCauley .......... 364/571.01
5,392,360 2/1995 Weindelmayerr et al. .......... 382/8
5,404,156 4/1995 Yamada et al. .......... 347/115
5,412,577 5/1995 Sainio et al. .......... 364/469
5,416,613 5/1995 Rolleston et al. .......... 358/518
5,420,945 5/1995 Concannon et al. .......... 382/312
5,424,553 6/1995 Morton .......... 250/548
5,452,112 9/1995 Wan et al. .......... 358/504
5,459,678 10/1995 Feasey .......... 364/571.07
5,463,469 10/1995 Funada et al. .......... 358/296
5,467,412 11/1995 Capitant et al. .......... 382/167
5,483,360 1/1996 Rolleston et al. .......... 382/518
5,488,492 1/1996 Abe .......... 358/518
5,491,568 2/1996 Wan .......... 358/518
5,493,518 2/1996 Keating .......... 364/578
5,508,810 4/1996 Sato .......... 358/296
5,509,086 4/1996 Edgar et al. .......... 382/167
5,509,115 4/1996 Butterfield et al. .......... 395/147
5,521,722 5/1996 Colvill et al. .......... 358/500
5,530,656 6/1996 Six .......... 364/526
5,543,940 8/1996 Sherman .......... 358/518
5,604,586 2/1997 Bahr et al. .......... 356/244

CAMERA: SINGLE CCD
WITH BUILT IN FILTERS

CONTROL SYSTEM FOR A PRINTING PRESS

CROSS REFERENCE TO RELATED APPLICATION

This application is a continuation-in-part of application Ser. No. 08/265,701 filed Jun. 24, 1994 abandoned, a continuation of application Ser. No. 07/800,947, filed Dec. 2, 1991 abandoned.

BACKGROUND OF THE INVENTION

The present invention relates to control systems for a printing press.

In the past, four process inks (cyan, magenta, yellow and black) have been used on a printing press to produce copies with a gamut of colors. To improve trapping and reduce ink cost, various undercolor removal techniques (UCR) and grey component replacement (GCR) techniques have been used in the color separation processing. The UCR and GCR techniques remove a certain amount of the cyan, magenta and yellow ink from some printing areas and replace them with a certain amount of the black ink. Thus, the black ink has been used to generate not only the text but also the color image. Different color separation equipment manufacturers offer different UCR and GCR techniques to determine when this black ink substitution will take place and what amount of inks will be substituted.

In the past, the press room color reproduction quality control system can be divided into the following two categories: one is a "control by target" system, and the other is a "control by image" system.

In the "control by target" system, a set of color control targets is printed in a margin. Instruments, such as densitometers, are used to monitor the color attributes, such as the optical density, of these targets. The printing press is then adjusted based on the deviation of these control targets from a predefined attribute value. The application of this "control by target" system is restricted in that an additional process is required to cut off this target from the final product. This system also requires a tight material control for paper, ink, and other printing parameters.

In the "control by image" system, the print image on a live copy is compared with the printed image on a reference copy, called a proof. The press is then adjusted based on the difference between the live image and the reference image. This system is more versatile because it does not require an additional target. This system is also more accurate than the "control by target" system, because in some situations although the measured attributes of control targets on the live and reference images are the same, those two images still look different. Conventionally, both the image comparing task and the press adjusting task are done by a press operator. To improve the productivity and the color consistency, several automatic printing quality inspection systems have been reported recently. These systems use opto-electronic sensor devices, such as a spectrophotometer, or CCD color cameras, to measure the color reproduction quality. Currently, the bandwidth of these sensor devices is limited to the visible region of 400 nm through 700 nm in wavelength of the electromagnetic spectrum. However, within the visible region, it is not possible for these devices to reliably distinguish the black ink from the process black made by the combination of cyan, magenta, and yellow inks, or to determine whether the black ink or all cyan, magenta, and yellow inks should be adjusted. Although, these devices such as the spectrophotometer might be able to measure the printed color accurately, it is difficult to use the measured color information to achieve the automatic control for a four-color press without a target due to the involvement of the UCR and GCR techniques.

U.S. Pat. No. 3,376,426 to Frommer (1968) discloses a density monitor system which includes an infrared sensor for detecting the presence of the black ink and a linear 4-by-4 subtractive suppression matrix for reducing the effect caused by the impurity of the ink. It is also suggested by Frommer that the linear matrix is adjusted for a correct response at one maximum level of density. Since neither the dot gain, the trapping, nor the relation between the ink volume and the light reflectance is in a linear form, the output of Frommer's suppression matrix does not represent the amount of ink presented on the paper. Especially when color inks are mixed with the black ink, the output of this suppression matrix for these color inks will not have a large amount of error. This large error can cause an ink control system to adjust the wrong inks or in a wrong direction, resulting in an unstable system. For this reason, Frommer's system can not be used to control the printing process in a stable and accurate way, nor preset the printing press based on a given reference. Furthermore, Frommer's system is not concerned about the ink coupling effect between ink zones and does not teach that measurement information from more than one ink zones should be combined in order to correctly adjust the ink feed rate for one ink zone.

U.S. Pat. No. 4,649,502 to Keller (1987) discloses a demask process to determine the surface coverage for each ink by solving extended Neugebauer equations iteratively. The extended Neugebauer equations used in Keller's processing are stochastic models which have no consideration about dot gain (called "point increment" by Keller) and trapping factors for different dot sizes. Thus, Neugebauer equations become less accurate, especially when the dot size of one or more inks are in the vicinity of 50 percents, or one ink has a low dot size while the other three inks have high dot sizes. Therefore, Keller's process must further include weighting matrices G1 and G3 to compensate errors caused by the dot gain and the over-printed colors, respectively. However, even with these compensations, the error produced by the demask process will propagate into the ink feed rate calculation making the color adjustment processing less accurate. Furthermore, Neugebauer equations do not give the wanted surface coverage values explicitly. A long and complicated iterative processing has to be used to solve these multi-variable non-linear simultaneous equations. This process is a very time consuming task since it has to be performed for a large number of measurement elements. This process is also a very risky task since the coefficient matrices of these equations may be singular or ill-conditioned for certain reflectance combinations resulting in a very poor solution, or none at all. Furthermore, Keller does not suggest to include the ink zone coupling factor into the ink control system and, therefore, can not achieve an optimal ink feed rate control.

There are two basic tasks that a "control by image" system must accomplish.

The first task is to determine the amount of each process inks presented on the paper and the ink volume difference between a production copy and a reference copy. For a "control by target" system, this is an easy task. Because each process ink is printed as a separate target area, the volume of each ink presented on the paper can be estimated by using the ink film thickness calculated from the solid density measured from this target area. Since there is no separate control target, a "control by image" system must be able to detect the amount of each process ink from any printed area, including areas containing one, two, three even all four inks. It has been well recognized that the printing is a non-linear process. Many non-linear factors, especially dot gain and trapping, greatly effect the color appearance of a printed copy. A "control by image" must handle these non-linear factors correctly in order to determine the amount of each process inks presented in a given area on the paper with a practically acceptable accuracy.

The second task is to adjust the ink feed rate and other press parameters in an optimal way based on the detected ink volume deviation in order to maintain the color consistency. The optimal control is important because it can achieve and maintain the desired color quality in a shortest possible time so that the amount of printed waste can be reduced. Usually, for many printing presses, the ink feed control is achieved by dividing the full width of a printing press into many narrow ink zones. Each ink zone has its own adjustment device, or called ink key, to regulate the ink feed rate. It is also very common for a printing press to utilize one or more oscillation rollers to improved the ink film evenness across the printed copy. Because of the lateral movement of these oscillation rollers, ink delivered into one ink zone may flow into other ink zones. Therefore, adjusting the ink feed rate for one ink zone will effect the color of adjacent zones. A "control by image" system must handle this ink coupling effect correctly in order to provide an acceptable accuracy.

SUMMARY OF THE INVENTION

A principal feature of the present invention is the provision of an improved control system for a four-color printing press.

The printing press control system of the present invention comprises, means for detecting the energy reflected from a paper surface in both the visible region and the infrared region of the electromagnetic spectrum, means for directly and explicitly converting the output of the detecting means to a set of variables which represent the amount of ink presented on the paper for any of the cyan, magenta, yellow and black inks, and means responsive to the converting means for adjusting the four-color printing press to maintain the color consistency.

A feature of the present invention is the provision of a sensor structure or device for detecting the energy reflected from the paper surface, with the sensor structure having a minimum of four separate channels, and with at least one channel operable in the infrared region of the electromagnetic spectrum.

Another feature of the invention is that the bandwidth of the infrared channel may be between 800 nm and 1100 nm, which is a portion of the near infrared region and which is within the working wavelength range of a regular silicon detector.

Yet another feature of the invention is that the working wavelength of the infrared channel may be longer than 1100 nm or within the 700–800 nm transition region.

A further feature of the invention is that at least three distinct channels are utilized in the visible region. Three of these channels may correspond to red, green and blue (RGB), or cyan, magenta, and yellow (CMY), or other colors. The bandwidth of each channel may be less than 70 nm, more than 100 nm, or any value in between, with channels having a multiple peak in its passing band, such as magenta, being also included.

Another feature of the invention is that the sensor device can be constructed from either a single element detector, a one-dimensional (linear) detector, a two-dimensional (area) detector, or other suitable detector structure.

Yet another feature of the invention is that the sensor can be constructed by adding an additional infrared channel to existing devices, e.g., adding an infrared channel to a RGB color camera or a densitometer, or by extending the working band into the infrared region e.g., adding infrared capability to a spectrophotometer.

A further feature of the invention is that the light source used provides enough radiated energy in both the visible region and the infrared region, depending upon the sensor working band and sensitivity.

Still another feature of the invention is that all possible values which are output from the sensor device may be used to form a vector space. For example, all possible values output from a sensor device with Red, Green, Blue, and Infrared channels form a four dimensional vector space R-G-B-IR, being termed a sensor space, with each output from the sensor device being termed a vector in the sensor space.

Another feature of the invention is that the minimum number of dimensions required by this sensor structure is four.

Still another feature of the invention is that a set of variables can be defined to represent the amount of ink presented in a given area. For example, a set of variables C, M, Y, and K (black) can be defined to represent or be a function of the amount of cyan, magenta, yellow and black ink in a given area. This set of variables may correspond to the ink volume, average ink film thickness, dot size, or other quantities related to the amount of ink in a given area on the paper surface, with the vector space by this set of variables being termed an ink space, with the ink space having formed a dimension of four for a four-color printing press.

Another feature of the invention is that there exists at least one transfer function which can directly and explicitly map a vector in the four dimensional ink space into a vector in the four dimensional sensor space, with the transfer function being termed a forward transfer function.

Yet another feature of the invention is that the forward transfer function can be used in a soft proof system, which can electronically generate a proof image. This electronically generated proof image can be stored in the system as a reference, or can be displayed on a CRT screen for visual inspection.

A further feature of the invention is that there exists at least one transfer function which can explicitly map a vector in the four dimensional sensor space into a vector in the four dimensional ink space, with the transfer function being termed a reverse transfer function. This reverse transfer function reflects the characteristics of the printing process, including at least the color of the paper, the impurity of the process inks, the dot gain with respect different dot sizes and trapping effects between inks.

Another feature of the invention is that the reverse transfer function can be developed by analyzing the data obtained from a color test form. The color test form comprises color patches to represent dot gain, trapping and other important print processing characteristics. The reverse transfer function can be implemented as a data-look-up table or as a set of formulas developed by a regression process.

Another feature of the invention is that the printed image on a live copy can be compared with the printed image on a reference copy in the sensor space. If the difference between the live copy and the reference copy is within a predefined tolerance level, at least for all channels in the visible region of the sensor space, the live copy is said to be acceptable by definition.

Yet another feature of the invention is that both the live image and the reference image in the sensor space can be mapped into the ink space by applying the reverse transfer function point by point. The difference between the live image and the reference image in the ink space thus represents the difference of the ink distribution for each of the cyan, magenta, yellow, and black inks.

Another feature of the invention is that at least two quality factors can be found for each ink zone of each ink from the difference between the live and the reference images in the ink space. These two quality factors indicate which printing unit should be adjusted, which direction (up or down) it should be adjusted, and the amount of ink which should be adjusted. One factor is used to describe the total volume of this ink within this ink zone and the other factor is used to describe the volume of this ink which is transferred from two adjacent ink zones.

A feature of the invention is that a press control formula can be developed to adjust press parameters, such as ink input rate in lithographic or letterpresses, ink consistency in flexographic or gravure presses, water input rate in lithographic presses, or temperature in any of the above, based on the differences between the live and the reference image in the ink space.

A further feature of the invention is that the press adjustment can be achieved by an automatic control system, by the press operator alone, or by the interaction between the automatic control system and the press operator.

Still another feature of the invention is that the sensor device may be used to monitor the printing web of the press directly, i.e., on the press sensing, or to monitor the prints collected from the folder of the press, ie., off press sensing.

A further feature of the invention is that if the digital images from the color separation processing, or the film/plate images are available, the image of the reference copy in the sensor space can be generated electronically by the forward transfer function.

Yet another feature of the invention is that the electronically generated reference as well as a proof image may be used to set up the press in order to reduce the make ready time.

Yet another feature of the invention is that the color reproduction quality can be maintained through the entire press run, through different press runs on different presses, or at different times.

Still another feature of the invention is that a closed loop automatic color reproduction control system may be formed with or without an additional color control target.

A further feature of the invention is that the variation of ink, paper, dot gain, trapping effect, and other press parameters can be compensated, such that the printed copies have the highest possible overall results in matching the reference copy.

Further features will become more fully apparent in the following description of the embodiments of this invention, and from the appended claims.

DESCRIPTION OF THE PREFERRED EMBODIMENTS

Figure 1:
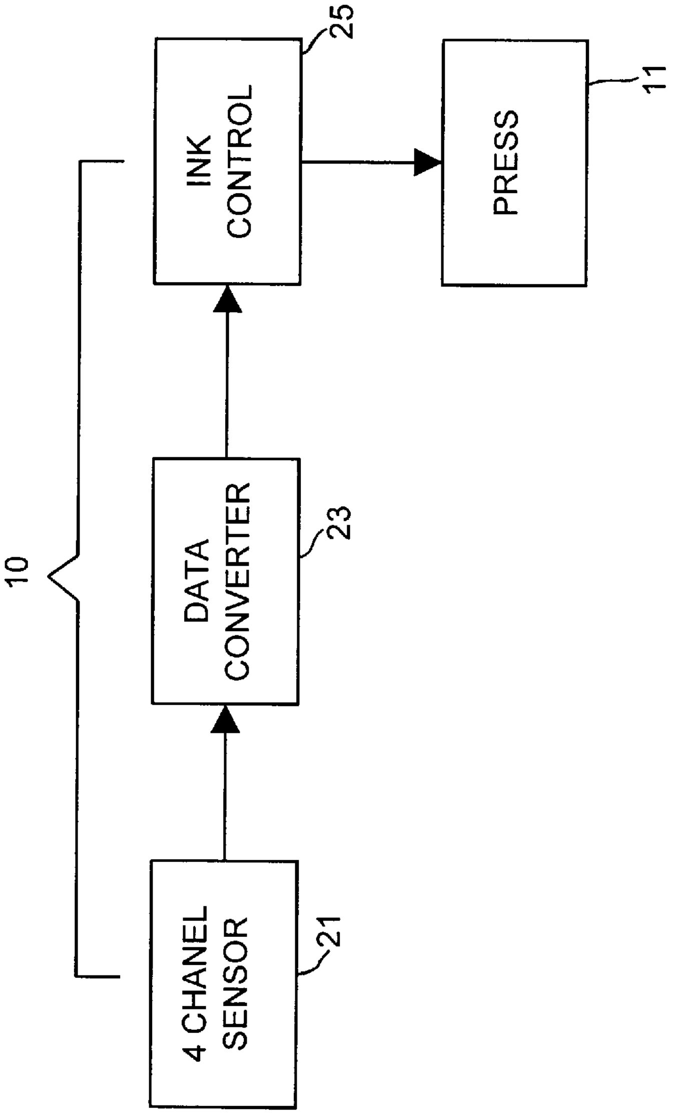
FIG. 1 is a block diagram of a control system for a printing press of the present invention.

Referring now to FIG. 1, there is shown a control system generally designated 10 for a printing press 11 of the present invention.

Figure 8:
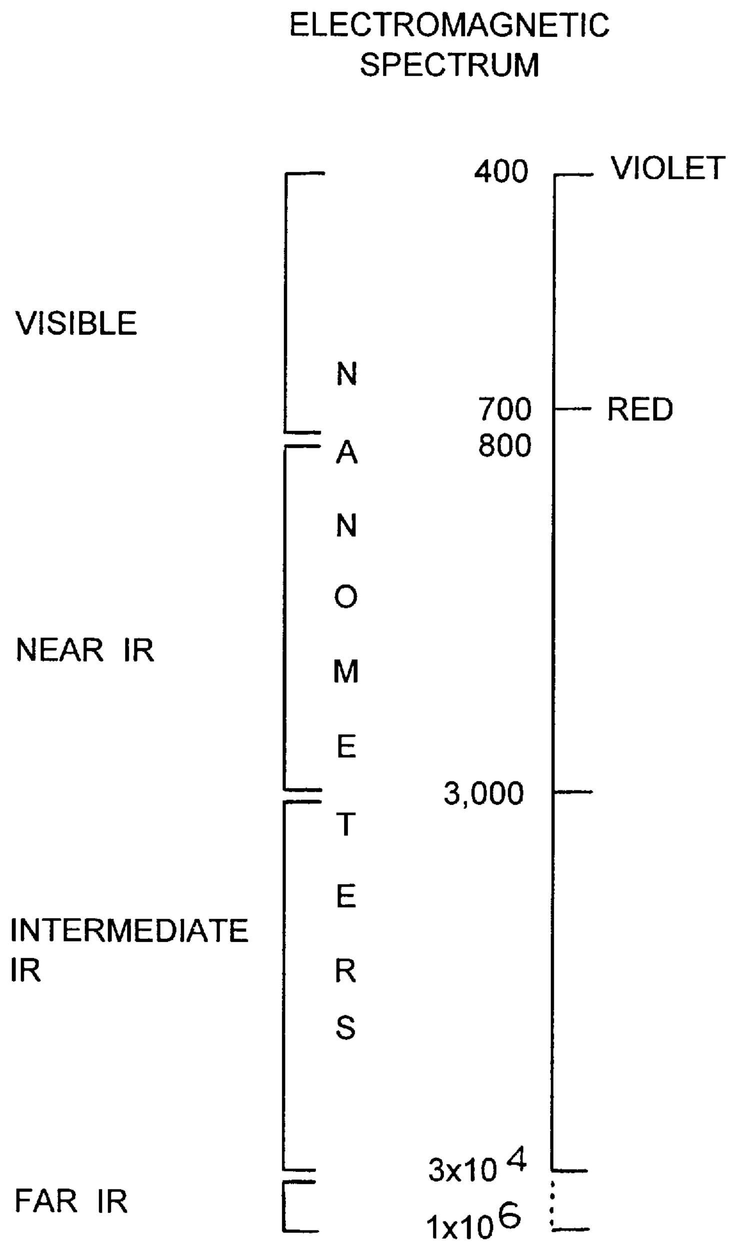
FIG. 8 is a diagrammatic view of a spectrum of electromagnetic waves including the visible spectrum and the infrared spectrum.

The control system has a 4 channel sensor 21, a data converter 23 for processing information from the sensor 21, and a device 25 for controlling ink for the press 11. As will be seen below, the 4 channel sensor 21 detects the energy reflected from a paper surface, such as the paper web for the press 11, in both the visible region and the infrared region of the electromagnetic spectrum. As shown in FIG. 8, electromagnetic waves in the infrared region have a longer wave length than the visible spectrum, with the wave lengths of the electromagnetic waves in the region of visible light being approximately 400 to 700 nanometers (nm), and the wave lengths of the electromagnetic waves in the infrared region, including near infrared, being equal to or greater than 800 nm.

Figure 2:
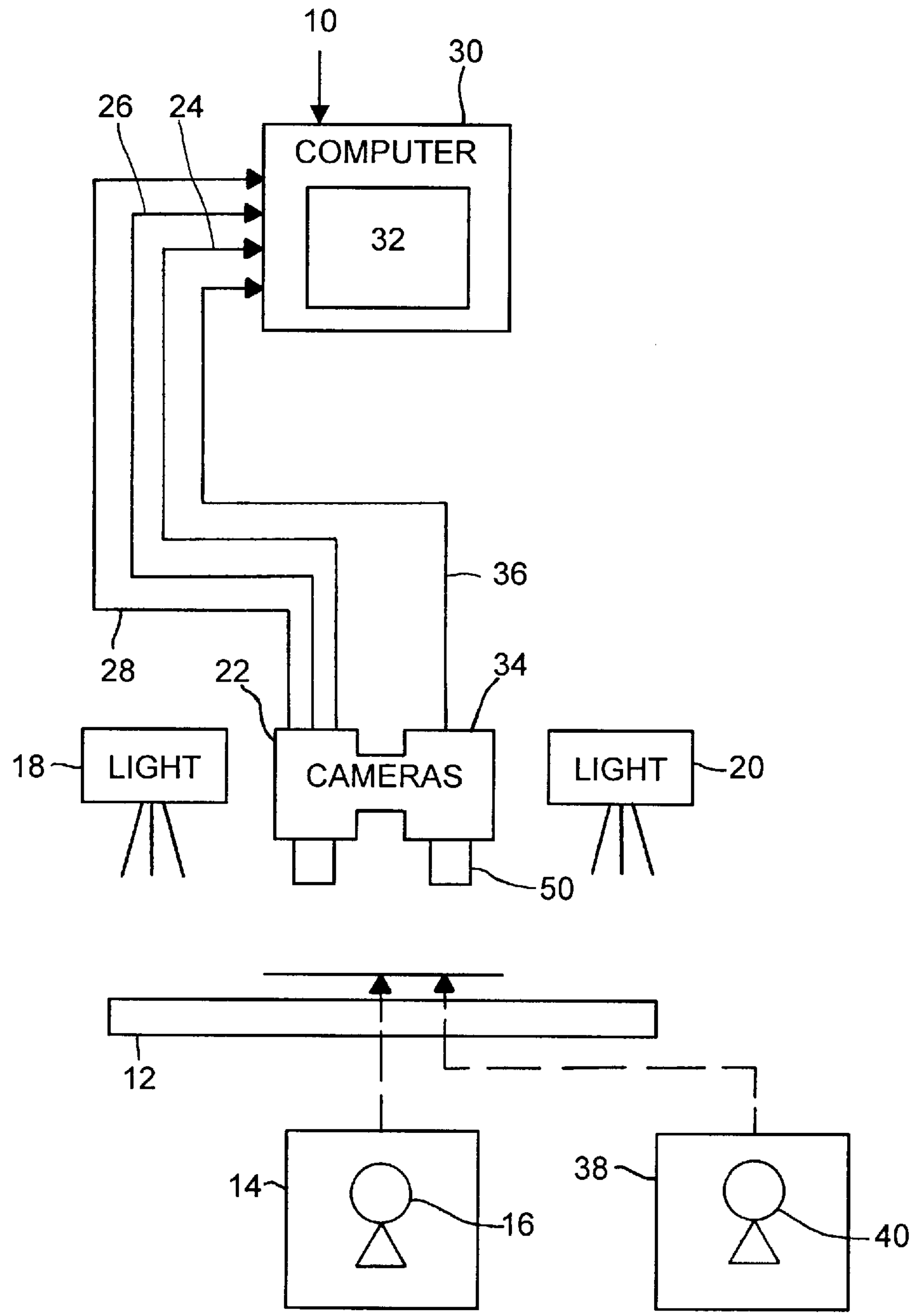
FIG. 2 is a diagrammatic view of the system of FIG. 1.

As shown in FIG. 2, the control system 10 has a support 12 for placement of a sheet of paper 14 with image or indicia 16 on the sheet 14 in a configuration beneath a pair of opposed lights 18 and 20 for illuminating the sheet 14. The system 10 has a first color video camera or sensor 22 having three channels for detecting attributes of the inks from the sheet 14 in the visible region of the electromagnetic spectrum, such as red, green, and blue, or cyan, magenta, and yellow and for sending the sensed information over separate lines or leads 24, 26, and 28 to a suitable digital computer 30 or Central Processing Unit having a randomly addressable memory (RAM) and a read only memory (ROM), with the computer or CPU 30 having a suitable display 32. Thus, the three distinct color attributes of the inks are sensed by the camera 22 from the sheet 14, and are received in the memory of the computer 30 for storage and processing in the computer 30.

The system 10 also has a black/white second video camera or sensor 34 having a filter 50 such that it senses the attributes of the inks in the infrared region of the electromagnetic spectrum, having a wave length greater than the wave length of the electro-magnetic waves in the visible region of light. The camera or sensor 34 thus senses infrared information from the sheet 14, and transmits the sensed information over a lead 36 to the computer 30, such that the information concerning the infrared rays is stored in a processed by the computer 30.

Figure 7:
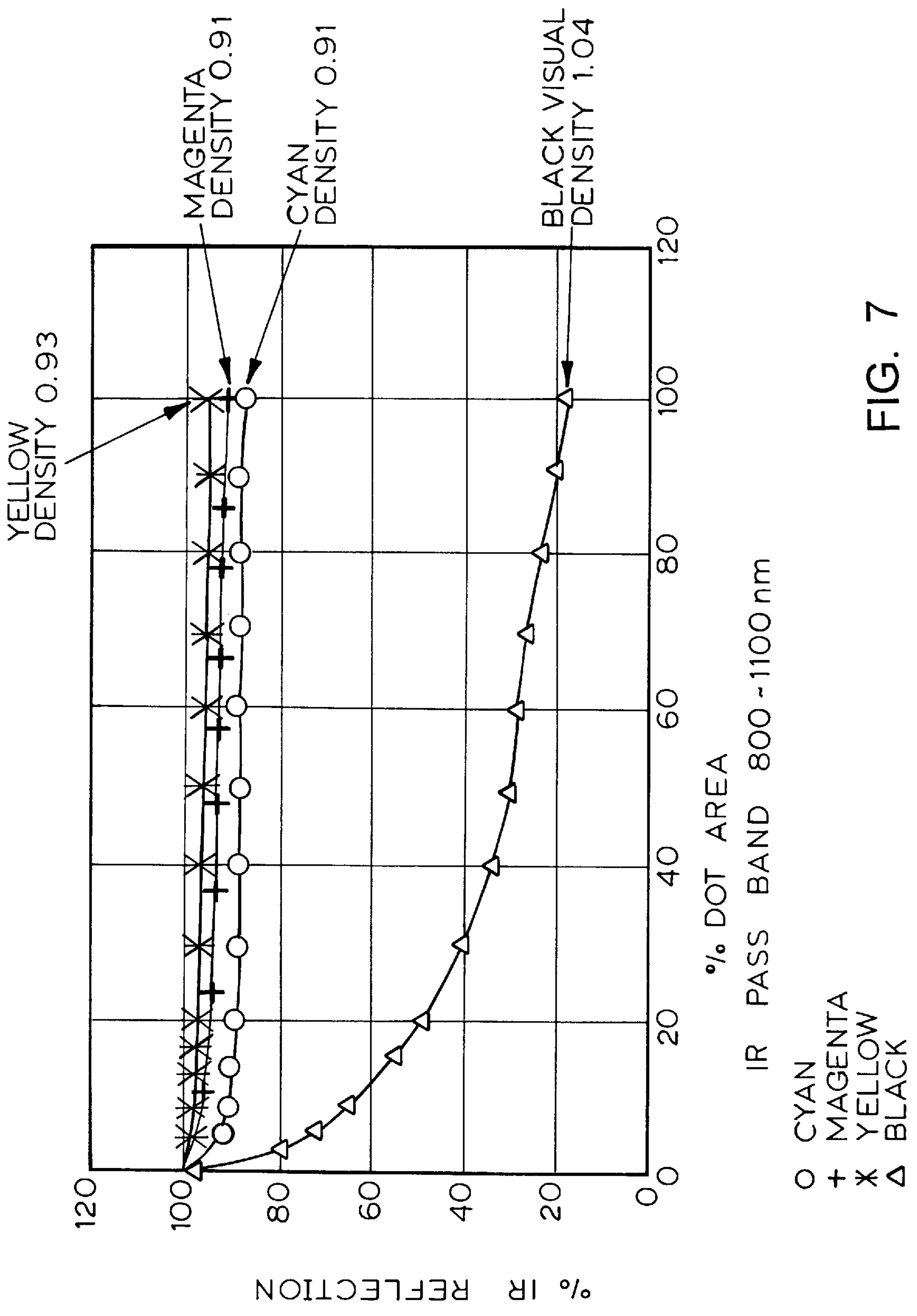
FIG. 7 is a chart plotting the normalized percentage of IR Reflection against the percentage Dot Area in a printed sheet.

The normalized percentage of the infrared (IR) reflection vs. the percentage of dot area is shown in the chart FIG. 7. It will be seen that the infrared reflectance of cyan, magenta, and yellow inks show no significant change as a function of percentage of dot area. However, the normalized infrared reflectance of the black ink displays a significant change as a function of percentage of dot area, and changes from a normalized value of 100% IR reflection for 0% dot area to approximately 18% IR reflection corresponding to 100% dot area. Hence, the black ink may be sensed and distinguished from other color inks in the infrared region of the electro-magnetic waves.

As shown in FIG. 2, the sheet 14 may contain a printed image or indicia 16 which is obtained from a current press run of the press 11, termed a live or current copy. In addition, a sheet 38 containing printed image or indicia 40, termed a reference copy, from a previous reference press run may be placed on the support 12 beneath the cameras 22 and 34 in order to sense the energy reflected from sheet 38, and send the sensed information to the memory of the computer 30 for storage and processing in the computer 30, as will be described below.

Thus, the cameras or sensors 22 and 34 may be used to sense both the current copy or sheet 14 and the reference copy or sheet 38. The information supplied by the cameras 22 and 34 is formed into digital information by a suitable analog to digital converter in a frame grabber board on the computer 30. Thus, the computer 30 operates on the digital information which is stored in its memory corresponding to the information sensed from the sheets 14 and 38 by the cameras or sensors 22 and 34.

Figure 3:
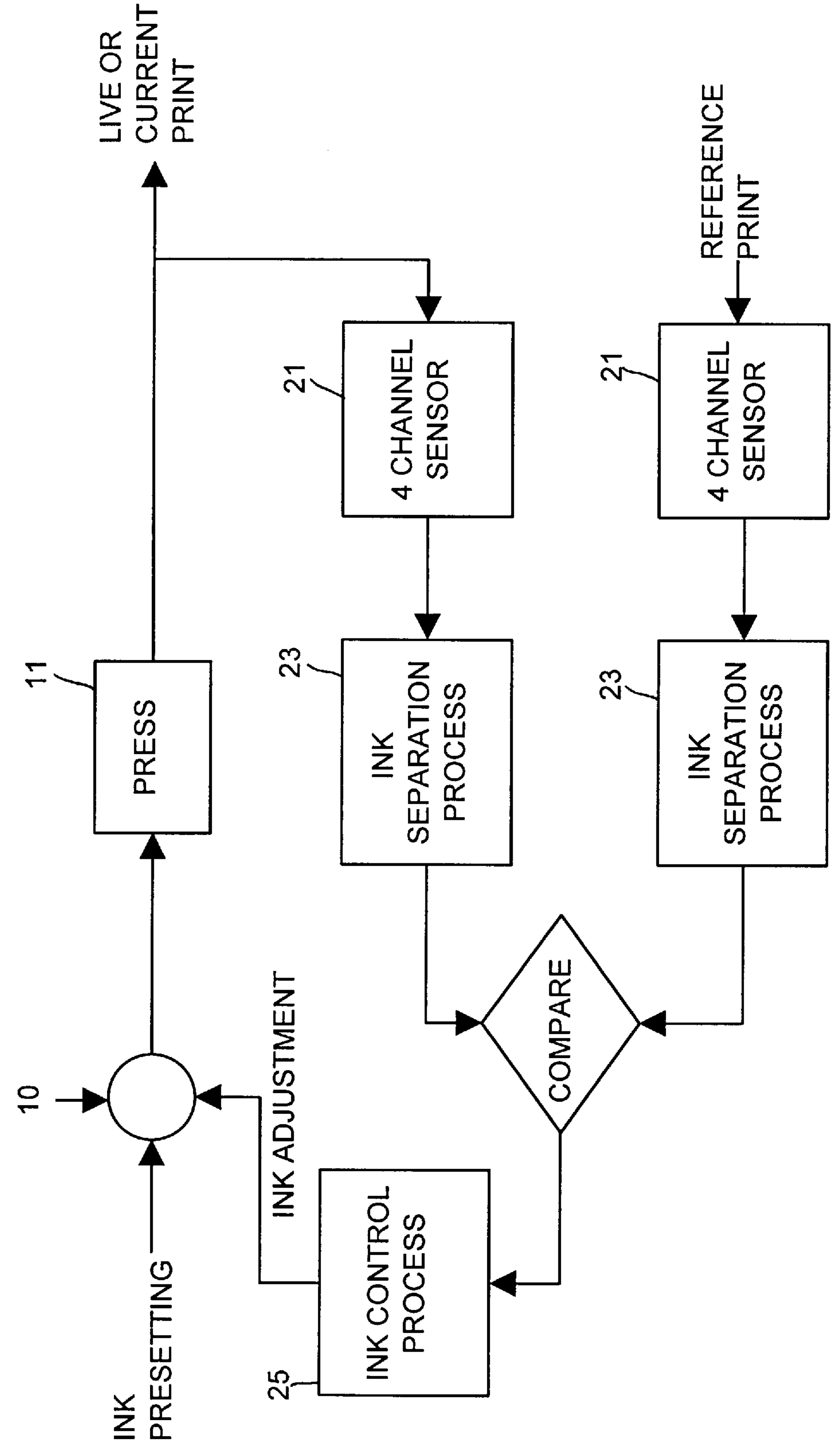
FIG. 3 is a block diagram of the control system of FIG. 1.

Referring now to FIG. 3, there is shown a block diagram of the control system 10 for the printing press 11 of the present invention. As shown, the four inks (cyan, magenta, yellow and black) of the four-color printing press 11 are first preset, after which a print is made by the press 11 with a current ink setting, thus producing a live or current printed copy, as shown. The color and black/white video cameras or sensors 22 and 34 of FIG. 2 serve as a four channel sensor 21 to capture an image of the current printed copy, and then place this information into the memory of the computer 30 after it has been formed into digital information.

Next, an "Ink Separation Process" 23 is used to convert the red, green, blue and IR images captured by the four channel sensor 21 into four separated cyan, magenta, yellow and black ink images, which represent the amount of corresponding ink presented on the live copy. The "Ink Separation Process" 23 may utilize mathematic formulas, data look up tables or other suitable means to perform the data conversion task.

The similar processes are also applied to the reference copy. First, the four channel sensor 21 is used to capture the red, green, blue and IR images from the reference copy. Then, the "Ink Separation Process" 23 is utilized to obtain the cyan, magenta, yellow and black ink images, which represent the amount of corresponding ink presented on the reference copy.

As shown, the ink images of the live copy are compared with the ink images of the reference copy by the computer 30 to detect the variation of ink distribution for each of the cyan, magenta, yellow and black inks. The variation of ink distribution can be categorized as ink zone related, dot size related and other ink related. By analyzing the characteristic of the ink distribution variation, ink feed rate, ink water balance and other press parameters can be adjusted accordingly. If the variation of ink distribution is ink zone related, ink feed rate should be adjusted. For example, if all printed areas within an ink zone on a live copy lack a particular ink, the ink feed rate of this ink should be increased. Dot size related ink distribution variation usually indicates a change in dot gain or ink-water balance. Normally, this type of variation will effect multiple ink zones. For example, in a lithographic press if the ink value on a live copy increases noticeably in a blank or low dot size area, a low water condition, called scum, may have occurred. Increase the water feed rate could be the solution. If the variation of the ink distribution is related to other ink or inks which have been already printed on the paper, ink trapping characteristic may have changed. As an example, if ink variation is noticed only in a multiple ink area (such as red area which consists yellow and magenta inks) but not in single ink areas (such as yellow area or magenta area) ink trapping effect may have been changed.

The determined differences in ink distribution are then processed by the computer 30 in order to obtain an indication for controlling the keys or other devices of the press 11 in an ink control process, and thus provide an indication of an ink adjustment to the press to obtain further copies which will have a closer match to the reference copy. The indication of ink changes may be automatically supplied to the press 11, or the operator may utilize the indications of ink color attributes to set the press 11, such as adjustments to ink input rate by using the keys.

In the past, four process inks (cyan, magenta, yellow, and black) have been used on a printing press to produce copies with a gamut of colors. In these systems, the black ink has been used to generate not only the text but also the color image. In a control by image system, the print image of a live copy is compared with the printed image on a reference copy, termed a proof, and the press is adjusted based on the difference between the live image and the reference image. However, within the visible region, it is not possible to reliably distinguish the black ink from the process black made by the combination of cyan, magenta, and yellow inks, or whether the black ink or all cyan, magenta, and yellow inks should be adjusted.

In accordance with the present invention, the four channel sensor 21 is utilized to sense not only attributes in three channels of the visible region, the fourth channel of the sensor 21 senses an attribute in the infrared region in order to determine the correct amount of inks, including black ink, to correctly reproduce the proof. The printing press control system 10 uses the four channel detector or sensor 21 to detect the energy reflected from a paper surface, such as the sheets 14 and 38, or the paper web of the press 11, with three channels being in the visible region and one channel being in the infrared region of the electromagnetic spectrum. The control system 10 has a device 23 for converting the output of the sensing device 21 to a set of variables which represent the amount of ink presented on the paper for any of the cyan, magenta, yellow, and black inks, and a device 25 responsive to the converting device 23 for adjusting the four-color printing press 11 to maintain the color consistency.

In a preferred form, the bandwidth of the infrared channel may be between 800 nm and 1100 nm, which is a portion of the near infrared region, and which is compatible with a regular silicon detector, although the working wavelength of the 15 infrared channel may be longer than 1100 nm. At least three distinct channels are utilized in the visible region which may correspond to red, green, and blue (RGB), or cyan, magenta, and yellow (CMY), or other colors. The bandwidth of each channel in the visible region may be less than 70 nm, more than 100 nm, or any value in between, with channels having a multiple peak in its passing band, such as magenta, being also included.

According to the present invention, the sensor device 21 may be constructed from either a single element detector, a one-dimensional (linear) detector, a two-dimensional (area) detector, or other suitable detector structure, as will be seen below. The sensor device may be constructed by adding an additional infrared channel to existing devices, adding an infrared channel to a RGB color camera or a densitometer, or by extending the working band into the infrared region, e.g., adding infrared capability to a spectrophotometer. The light source 18 and 20 used provides sufficient radiated energy in both the visible region and the infrared region, depending upon the sensor working band and sensitivity.

Figure 9:
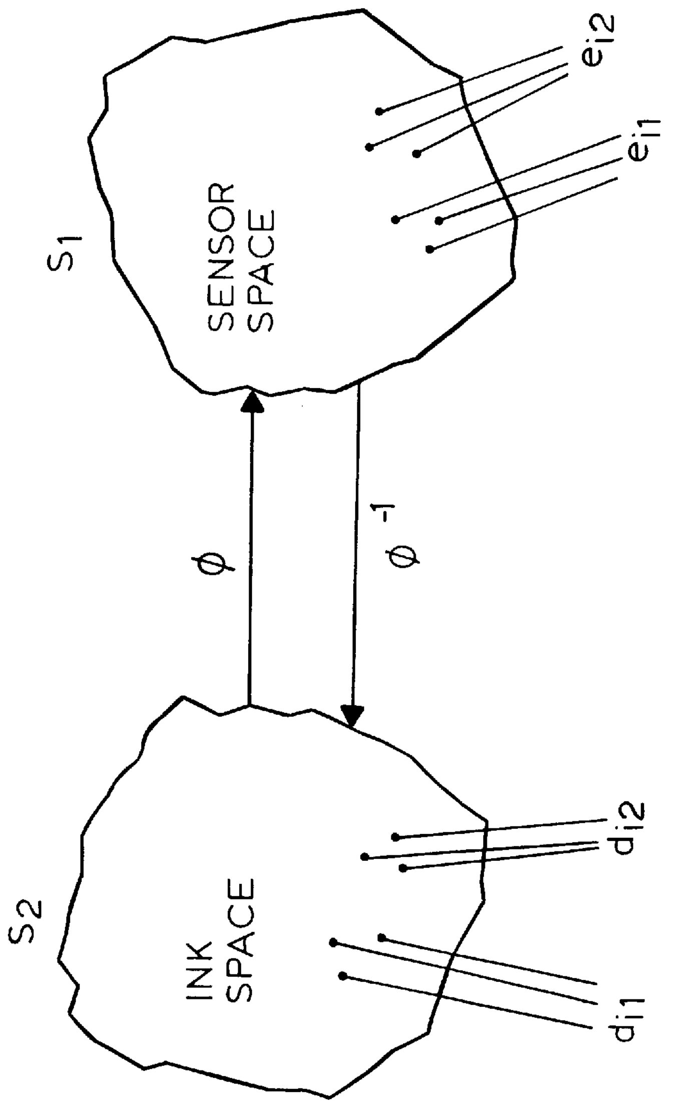
FIG. 9 is a diagrammatic view of set of elements for a sensor space and ink space.

All possible values which are output from the sensor device 21 may be used to form a vector space. For example, all possible values output from the sensor device 21 with red, green, blue and infrared channels form a four dimensional vector space R-G-B-IR, with the vector space being termed a sensor space $S_1$, with each output from the sensor device 21 being termed a vector in the sensor space $S_1$, with the minimum number of dimensions required by the sensor structure being 4. Thus, as shown in FIG. 9, a set $S_1$ of elements $e_{i1}$, and $e_{i2}$ being given, with the elements $e_{i1}$ of the set $S_1$ being the vectors $v_{i1}$ corresponding to the output from the sensor device 21 of sensing a live or current printed copy, and with the elements $e_{i2}$ of the set Si being the vectors $v_{i2}$ corresponding to the output from the sensor device 21 sensing a reference printed copy. In accordance with the present invention, the printed image on a live or current copy may be compared with the printed image on a reference copy in the sensor space, and if the difference between the live copy $L.C._s$ and the reference copy $R.C._s$ is within a predefined tolerance level delta, at least for all the channels in the visible region of the sensor space, such that, $|L.C._s - R.C._s| \leqq$ delta, the live or current copy is said to be acceptable by definition.

A set of variables may be defined to represent the amount of ink presented in a given area. For example, a set of variables, C, M, Y, and K can be defined to represent or be a function of the amount of cyan, magenta, yellow, and black ink in a given area. This set of variables may correspond to the ink volume, average ink film thickness, dot size, or other quantities related to the amount of ink in a given area on the paper surface. The vector space formed by this set of variables is termed an ink space $S_2$, with the ink space $S_2$ having a dimension of 4 for a four color printing press 11. Thus, with reference to FIG. 9, a set $S_2$ of elements $d_{i1}$, and $d_{i2}$ are given, with the elements $d_{i1}$ of the set $S_2$ being the vectors $v_{j1}$ corresponding to the variables associated with the live current copy in the ink space $S_2$, and with the elements $d_{i2}$ of the set $S_2$ being the vectors $v_{j2}$ corresponding to the variables associated with the reference copy in the ink space $S_2$.

Figure 10:
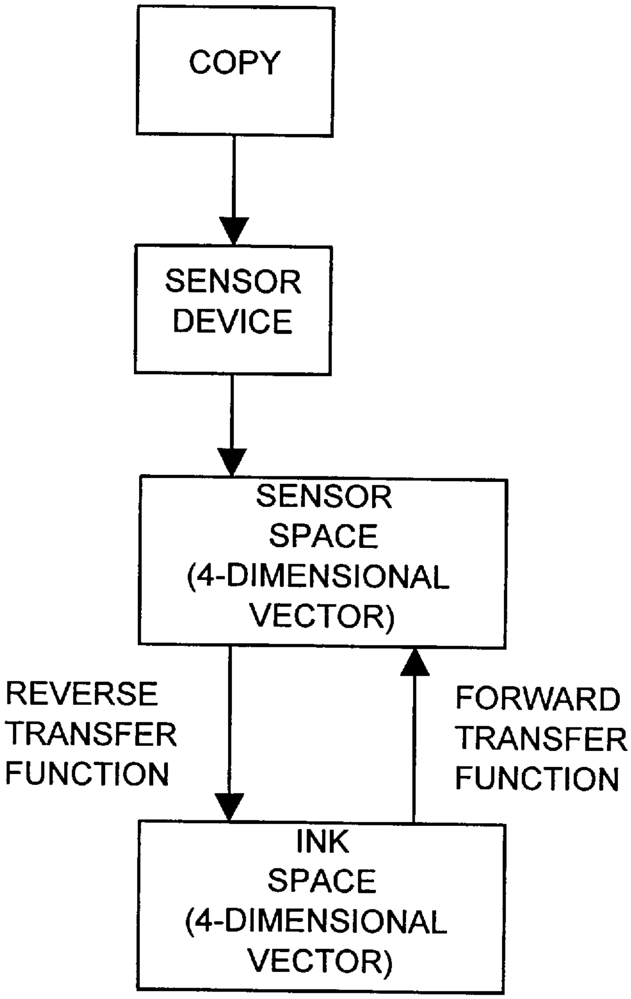
FIG. 10 is a block diagram of the sensor space and ink space in conjunction with the control system of the present invention.

With reference to FIG. 9, there exists at least one transfer function or transformation phi which can map the elements $d_{i1}$ and $d_{i2}$ of the set $S_2$, or the four dimensional ink space, into the elements $e_{i1}$ and $e_{i2}$ of the set $S_1$ or the four dimensional sensor space, with the transformation phi being termed a forward transfer function, as shown in FIGS. 9 and 10. It is noted that the subsets in each set $S_1$ and $S_2$ may overlap or may be the same.

In accordance with the present invention, the forward transfer function may be used in a soft proof system which can generate a proof image which can be stored in the system as a reference or can be displayed on a CRT screen.

With further reference to FIG. 9, there exists at least one transfer function or reverse transformation phi$^{-1}$ which can map the elements $e_{i1}$ and $e_{i2}$ of the set $S_1$ of the four dimensional sensor space into the elements $d_{i1}$ and $d_{i2}$ of the set $S_2$ of the four dimensional ink space, with the transfer function being termed a reverse transfer function. Thus, both the live image and the reference image in the sensor space or set $S_1$ can be mapped into the ink space or set $S_2$ by applying the reverse transfer function phi$^{-1}$ point by point as shown in FIGS. 9 and 10.

In the preferred embodiment, the above mentioned forward transfer function phi and reverse transfer function phi$^{-1}$ are developed by using a color test form. This color test form comprises a plurality of color patches to present the color of the inks and paper, dot gain, trapping effect and other important print processing characteristics. Such a color test form can be created by combining inks with different dot sizes. For example, if five dot sizes (0%, 25%, 50%, 75% and 100%) are selected for each ink, a color test form containing 625 (which is 5 to the fourth power) color patches can be designed to include all the combinations of these five dot sizes of four different inks. The more color patches contained in the test form, the higher accuracy these transforms can be developed. Depending upon the accuracy required and the computational power available, the number of color patches included in a color test form may be from about a hundred to several thousands. After the red, green, blue and infrared light reflectance have been measured from each of the color patches by using a four channel sensor, a data list is generated to show the relationship between the light reflectance and the dot sizes of each color patches. The forward and the reverse transfer functions are then developed from this data list. These two transfer functions can be implemented by using a look up table or a mathematical formula, or a combination of both.

These transfer functions can be implemented by look up tables. Usually, each of the cyan, magenta, yellow and black dot sizes and the red, green, blue and infrared reflectance is represented by an 8-bit number in a digital computer. Thus, a four dimensional vector in the sensor space $S_1$ (R, G, B, IR) or in the ink space $S_2$ (C, M, Y, K) can be represented by a 32-bit number. Therefore, either the forward transfer function or the reverse transfer function becomes a mapping from a 32-bit-number to another 32-bit-number. A 32-bit look up table can be developed for each of the forward and reverse transfer functions by utilizing an interpolation processing from the above mentioned data list. However, in the current computer configuration, it is too costly to implement two 32-bit data look up tables. An alternative way is to generate two intermediate look up tables of smaller sizes using an interpolation process, and then use the interpolation processing again to complete the two 32-bit mapping. For example, using an interpolation process, a 24-bit look up table can be created from the above mentioned data list. In this look up table, each four dimensional vector is represented by a 4 6-bit numbers. Then, by using the interpolation process, the final 32-bit result can be found.

Either the forward or the reverse transfer function can also be implemented by a set of mathematical formulas. A regression process can be used to find this set of formulas. For example, the following multi-variable polynomial formulas can be used to implement the forward and the reverse transfer functions. Forward transfer function:

$$r(c,m,y,k)=a_{10}+\sum_{i=1}^{N_1}(a_{1i}\times c^{e_{1i}}m^{f_{1i}}y^{g_{1i}}k^{h_{1i}}),$$

$$g(c,m,y,k)=a_{20}+\sum_{i=1}^{N_2}(a_{2i}\times c^{e_{2i}}m^{f_{2i}}y^{g_{2i}}k^{h_{2i}}),$$

$$b(c,m,y,k)=a_{30}+\sum_{i=1}^{N_3}(a_{3i}\times c^{e_{3i}}m^{f_{3i}}y^{g_{3i}}k^{h_{3i}}),$$

and $$Ir(c,m,y,k)=a_{40}+\sum_{i=1}^{N_4}(a_{4i}\times c^{e_{4i}}m^{f_{4i}}y^{g_{4i}}k^{h_{4i}}),$$

where, r(c,m,y,k), g(c,m,y,k), b(c,m,y,k), and Ir(c,m,y,k) are the reflectance of the red, green, blue and infrared spectrum, respectively, $N_1$, $N_2$, $N_3$ and $N_4$ are positive integers, and $N_1$, $N_2$ and $N_3$ are normally greater than 16, $a_{10}$, $a_{20}$, $a_{30}$, $a_{40}$, $a_{1i}$, $a_{2i}$, $a_{3i}$, and $a_{4i}$ are coefficients, $e_{1i}$, $f_{1i}$, $g_{1i}$ and $h_{1i}$ are non-negative integers and not equal to zero at the same time, $e_{2i}$, $f_{2i}$, $g_{2i}$ and $h_{2i}$ are non-negative integers and not equal to zero at the same time, $e_{3i}$, $f_{3i}$, $g_{3i}$ and $h_{3i}$ are non-negative integers and not equal to zero at the same time, and $e_{4i}$, $f_{4i}$, $g_{4i}$ and $h_{4i}$ are non-negative integers and not equal to zero at the same time, and c, m, y, and k are percentage of dot size for cyan, magenta, yellow and black inks, respectively.

Reverse transfer function:

$$c(r,g,b,Ir)=d_{10}+\sum_{i=1}^{P_1}(d_{1i}\times r^{s_{1i}}g^{t_{1i}}b^{u_{1i}}Ir^{v_{1i}}),$$

$$m(r,g,b,Ir)=d_{20}+\sum_{i=1}^{P_2}(d_{2i}\times r^{s_{2i}}g^{t_{2i}}b^{u_{2i}}Ir^{v_{2i}}),$$

$$y(r,g,b,Ir)=d_{30}+\sum_{i=1}^{P_3}(d_{3i}\times r^{s_{3i}}g^{t_{3i}}b^{u_{3i}}Ir^{v_{3i}}),$$

and $$k(r,g,b,Ir)=d_{40}+\sum_{i=1}^{P_4}(d_{4i}\times r^{s_{4i}}g^{t_{4i}}b^{u_{4i}}Ir^{v_{4i}}),$$

where, c(r, g,b,Ir), m(r,g,b,Ir), y(r,g,b,Ir) and k(r,g,b,Ir) are the equivalent dot size for cyan, magenta, yellow and black inks, respectively, $P_1$, $P_2$, $P_3$, and $P_4$ are positive integers, and $P_1$, $P_2$, and $P_3$ are normally greater than 16, $d_{10}$, $d_{20}$, $d_{30}$, $d_{40}$, $d_{1i}$, $d_{2i}$, $d_{3i}$, and $d_{4i}$ are coefficients, $s_{1i}$, $t_{1i}$, $u_{1i}$ and $v_{1i}$ are non-negative integers and not equal to zero at the same time, $s_{2i}$, $t_{2i}$, $u_{2i}$ and $V_{2i}$ are non-negative integers and not equal to zero at the same time, $s_{3i}$, $t_{3i}$, $u_{3i}$ and $v_{3i}$ are non-negative integers and not equal to zero at the same time, and $s_{4i}$, $t_{4i}$, $u_{4i}$ and $v_{4i}$ are non-negative integers and not equal to zero at the same time, and r, g, b and Ir are the reflectance of the red, green, blue and infrared spectrum, respectively.

All formula coefficients can be determined by a regression process. The above reverse transfer function explicitly maps the red, green, blue and infrared reflectance to the cyan, magenta, yellow and black equivalent dot sizes, and can be implemented on a computer. Certain terms in the formula can also be pre-calculated and stored in a look up table to save the computation time.

Since there is no need to solve a multi-variable non-linear simultaneous equation, the processing speed and accuracy can be secured. Furthermore, the color test form gives the footprint of the printing process, including almost all the important characteristics, such as dot gain and trapping, the forward and reverse transfer functions accurately represent the relationship between the sensor space and the ink space. Because the forward and reverse transfer functions are accurate, complicated compensation processes will not be required in the ink key control calculation.

Figure 11:
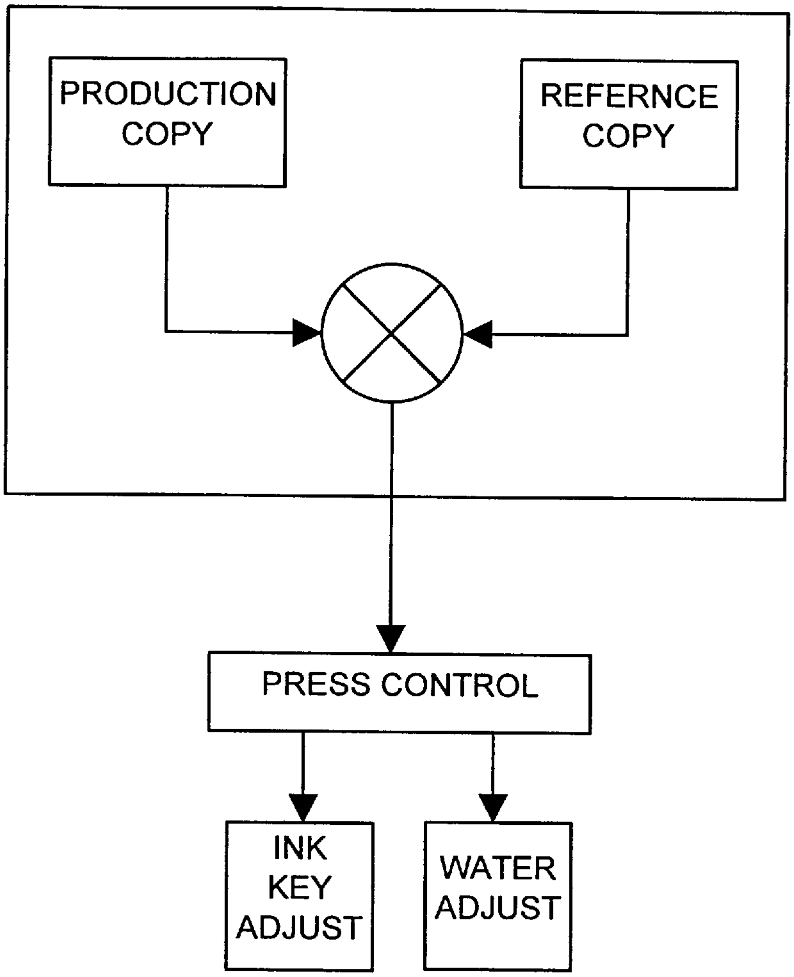
FIG. 11 is a block diagram of the control system for adjusting the printing press.

The difference between the live image and the reference image in the ink space $S_2$ represents the difference of the ink distribution for each of the cyan, magenta, yellow, and black inks, as shown in FIG. 11. The difference between the live and reference images in the ink space $S_2$ indicates which printing unit should be adjusted, which direction, up or down, it should be adjusted, and the amount of ink which should be adjusted. A suitable press control formula may be developed to adjust press parameters, such as ink input rate in lithographic or letterpresses, ink consistency in flexographic or gravure presses, water input rate in lithographic presses, or temperature in any of the above, based on the differences between the live and the reference image in the ink space $S_2$.

For ink feed rate control purpose, two factors should be found for each ink zone of each ink. These two factors are the ink volume ratio between the production copy and the reference copy, and the ink volume transferred into an ink zone from the two adjacent ink zones.

As an example, for the $J^{th}$ ink zone of the $I^{th}$ ink, The first factor $V_{ratio\_J\_I}$ is the ink volume ratio between the production copy $V_{prd\_J\_I}$ and the reference copy $V_{ref\_j\_i}$, such as $V_{ratio\_J\_I}=V_{prd\_J\_I}/V_{ref\_J\_I}$. If this ink volume ratio is greater than one, there is more $I^{th}$ ink on the production copy than on the reference copy in the $J^{th}$ ink zone. Ideally this factor, $V_{ratio\_J\_I}$, should be one for any ink zones and any inks. It has been found that the ink volume ratio $V_{ratio\_J\_I}$ between the production copy and the reference copy is approximately equal to their equivalent dot size ratio calculated from the reverse transfer function, such as $$V_{ratio\_J\_I}=V_{prd\_J\_I}/V_{ref\_J\_I}=Dot_{prd\_J\_I}/Dot_{ref\_J\_I},$$

where $Dot_{prd\_J\_I}$ and $Dot_{ref\_J\_I}$ are the averaged equivalent dot sizes within the $J^{th}$ ink zone of the $I^{th}$ ink for the production and reference copies, respectively.

Figure 12:
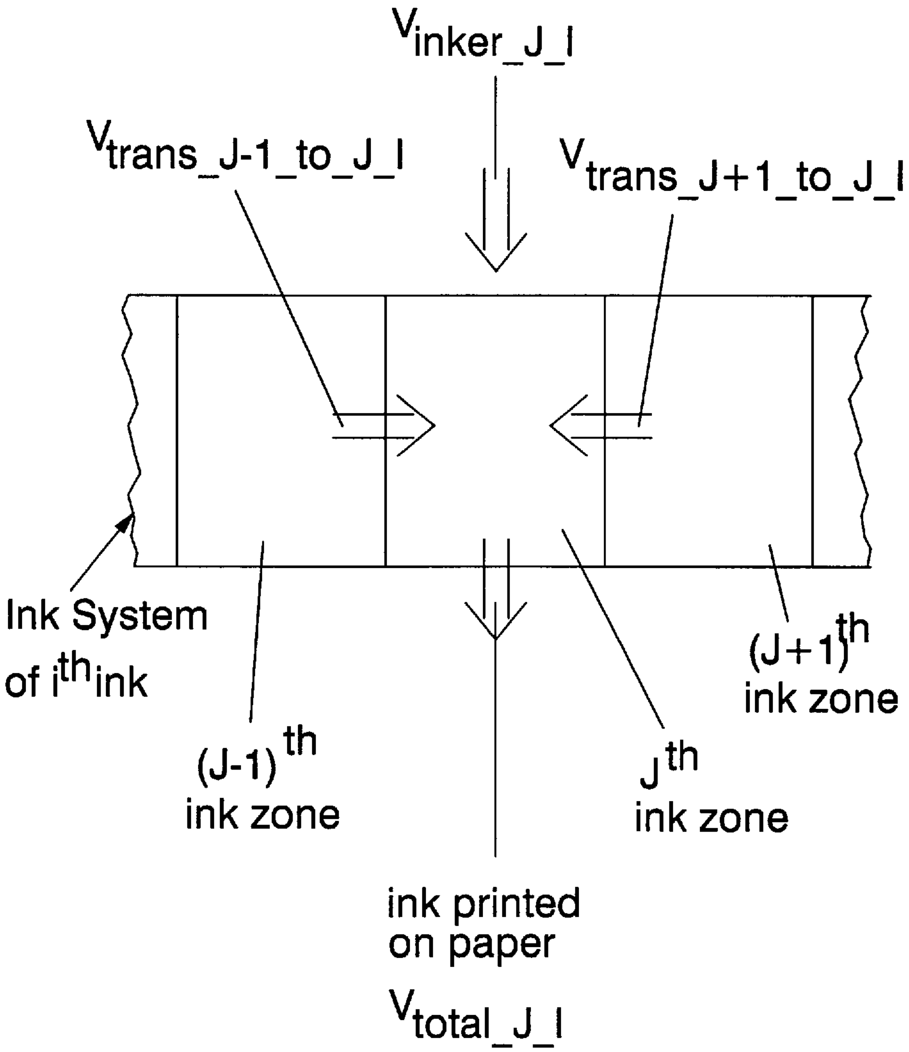
FIG. 12 is a diagrammatic view of ink zones for an inking system of the present invention.

The second factor $V_{trans\_J\_I}$ is the ink volume transferred from two adjacent ink zones (zone J−1and zone J+1) due to the lateral movement of the oscillation rollers for the $I^{th}$ ink. As shown in FIG. 12, in the steady state the amount of ink printed on the paper within each zone is equal to the total ink volume delivered into this zone. The total ink volume actually delivered into the $J^{th}$ ink zone of the $I^{th}$ ink, $V_{total\_J\_I}$ is the sum of the amount of the $I^{th}$ ink provided by the $J^{th}$ inker, $V_{inker\_J\_I}$, and the amount of the $I^{th}$ ink transferred from the (J−1)th and (J+1)th ink zones, $V_{trans\_j\_I}$, where $$V_{trans\_J\_I}=V_{trans\_J-1\_to\_J\_I}+V_{trans\_J+1\_to\_J\_I}.$$

It has also been found that the net amount of ink transferred between ink zones is proportional to the ink volume ratio difference between these two ink zones, such as $$V_{trans\_J-1\_to\_J\_I} = C_I \times (V_{ratio\_J-1\_I} - V_{ratio\_J\_I}) =$$

$$C_I \times ((Dot_{prd\_J-1\_I}/Dot_{ref\_J-1\_I}) - (Dot_{prd\_J\_I}/Dot_{ref\_J\_I})),$$

and $$V_{trans\_J+1\_to\_J\_I} = C_I \times (V_{ratio\_J+1\_I} - V_{ratio\_J+1\_I}) =$$

$$C_I \times ((Dot_{prd\_J+1\_I}/Dot_{ref\_J+1\_I})) - (Dot_{prd\_J\_I}/Dot_{ref\_J\_I})),$$

where $C_I$ is a constant for the $I^{th}$ ink.

Therefore, the ink volume transferred from the two adjacent ink zones into the $J^{th}$ ink zone, $V_{trans\_j\_I}$, can be calculated as $$V_{trans\_J\_I} = V_{trans\_J-1\_to\_J\_I} + V_{trans\_J+1\_to\_J\_I} =$$

$$C_I \times ((Dot_{prd\_J-1\_I}/Dot_{ref\_J-1\_I}) + (Dot_{prd\_J+1\_I}/Dot_{ref\_J+1\_I}) -$$

$$2(Dot_{prd\_J\_I}/Dot_{ref\_J\_I})),$$

where $C_I$ is a constant for the $I^{th}$ ink.

Ideally when ink film thickness is identical across all ink zones, there should be no net ink flow between ink zones. Thus the ideal ink key setting can be calculated from these two factors and the inker output function. If the volume of ink provided by the $J^{th}$ inker of the $I^{th}$ ink is described as a function $V_{inker\_J\_I}=F_{J\_I}(K)$, where K is the key setting, the desired ink volume $V_{desired\_J\_I}$ and the desired ink key setting $K_{desired\_J\_I}$ for the $J^{th}$ ink zone of the $I^{th}$ ink can be calculated by the following ink key control formula:

$$K_{desired\_J\_I} = F_{J\_I}^{-1}(V_{desired\_J\_I}) = F_{J\_I}^{-1}(V_{total\_J\_I}/V_{ratio\_J\_I}) =$$

$$F_{J\_I}^{-1}((V_{inker\_J\_I} + V_{trans\_J\_I})/V_{ratio\_J\_I} =$$

$$F_{J\_I}^{-1}((F_{J\_I}(k_{curre\_J\_I}) + V_{trans\_J\_I})/V_{ratio\_J\_I})$$

Where, $K_{desired\_J\_I}$ is the desired key setting value of the $J^{th}$ ink zone of the $I^{th}$ ink, $F_{J\_I}$ ( ) is the inker output function of the $J^{th}$ ink zone of the $I^{th}$ ink and this function can be determined by a separate test procedure, $F_{J\_I}^{-1}$ ( ) is the inversed inker output function of the $J^{th}$ ink zone of the $I^{th}$ ink, $k_{curre\_J\_I}$ is the current key setting of the $J^{th}$ ink zone of the $I^{th}$ ink, $V_{ratio\_J\_I}$ is the ink volume ratio of the $J^{th}$ ink zone of the $I^{th}$ ink, such as $V_{ratio\_j\_I}=V_{prd\_J\_I}/V_{ref\_J\_I}=Dot_{prd\_J\_I}/Dot_{ref\_J\_I}$, and $V_{trans\_J\_I}$ is the ink volume transferred from the two adjacent ink zones, such as $$V_{trans\_J\_I} = V_{trans\_J-1\_to\_J\_I} + V_{trans\_J+1\_to\_J\_I} =$$

$$C_I \times ((Dot_{prd\_J-1\_I}/Dot_{ref\_J-1\_I}) + (Dot_{prd\_J+1\_I}/Dot_{ref\_J+1\_I}) -$$

$$2(Dot_{prd\_J\_I}/D_{ref\_J\_I})).$$

In accordance with the present invention, the press adjustments can be achieved by the automatic control system 10, by press operator alone, or by the interaction between the automatic control system 10 and the press operator. Also, the sensor device 21 may be used to monitor the printing web of the press 11 directly, i.e., on press sensing, or to monitor the prints collected from the folder of the press, i.e., off press sensing. If the digital images from the color separation processing, or the film/plate images are available, the image of the reference copy in the sensor device 21 can be generated electronically by the forward transfer function phi. The electronically generated reference may be used to set up the press 11 in order to reduce the make ready time.

In accordance with the present invention, the color reproduction quality can be maintained through the entire press run, through different press runs on different presses, or at different times. Thus, a closed loop automatic color reproduction control system may be formed without an additional color control target. The variation of ink, paper, and other press parameters can be compensated such that the printed copies have the highest possible overall results in matching the reference copy.

Figure 4:
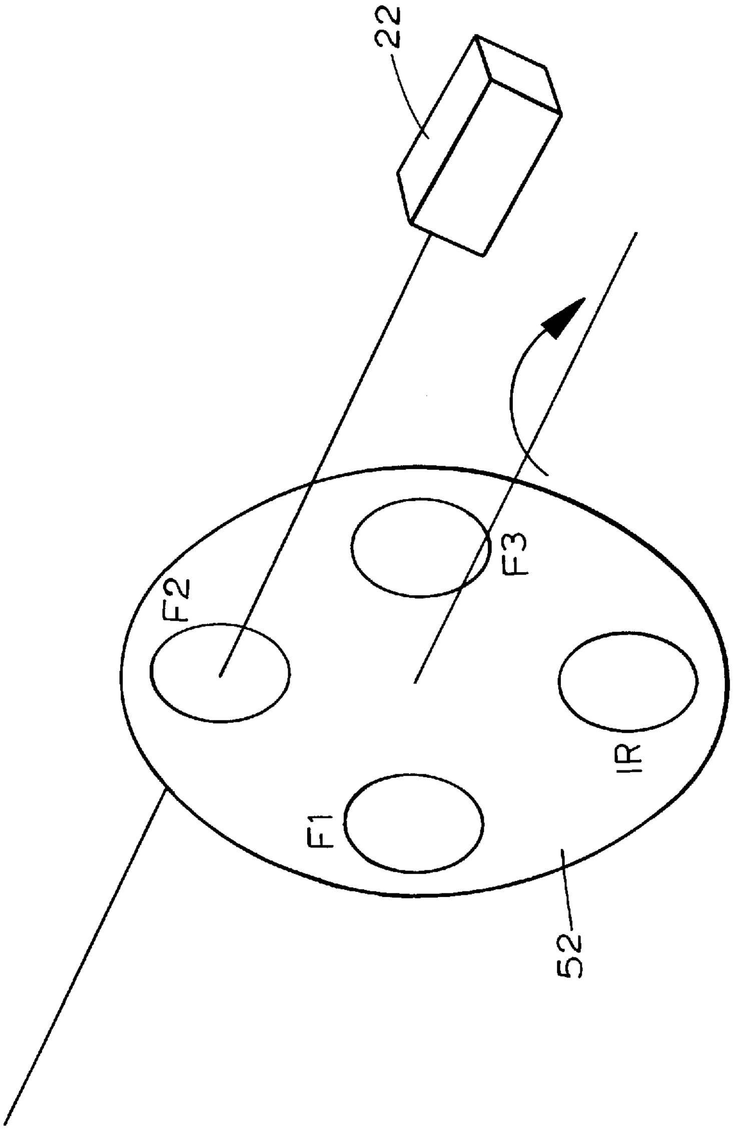
FIG. 4 is a diagrammatic view of a camera or sensor for the control system of the present invention.

As shown in FIG. 4, the camera or sensor 22 may be associated with a rotating filter member 52 having filters which only transmit the desired colors $F_1$, $F_2$, and $F_3$, such as red, green, and blue during rotation, such that the camera or sensor 22 senses and records the colors $F_1$, $F_2$, and $F_3$ sequentially or separately from the printed material which may be taken either from the current press run or from the reference press run. In addition, the filter member 52 may have an infrared (IR) filter $F_4$ in order to sense and record the energy reflected from the printed material in the infrared region. The information received by the camera or sensor 22 from the filters may be recorded in the computer of CPU for use in forming the desired data to control the inks, as previously discussed.

Figure 5:
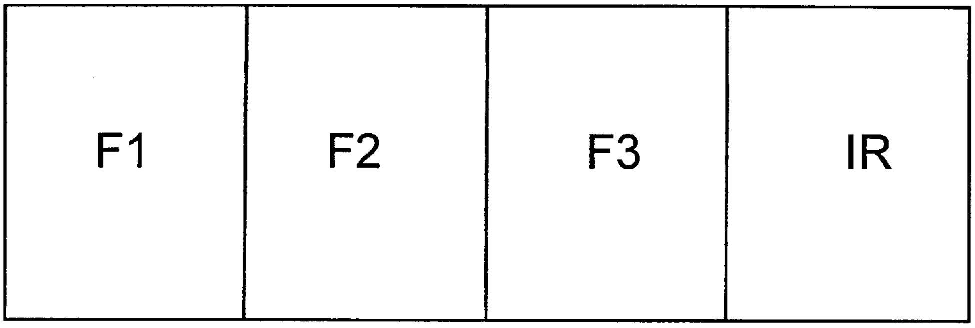
FIG. 5 is diagrammatic view of another embodiment of the camera or sensor for the control system of the present invention.

In another form, as shown in FIG. 5, the camera or sensor 22 may comprise a charge coupled device (CCD) with built in filters which converts light energy reflected from the printed material into electric energy in a video camera, i.e. $F_1$, $F_2$, $F_3$, and $F_4$ (IR), such as the distinct colors red, green, and blue in the visible region, and the near infrared energy in the infrared region, in order to supply the information to the computer 30 for storage and processing, as previously discussed.

Figure 6:
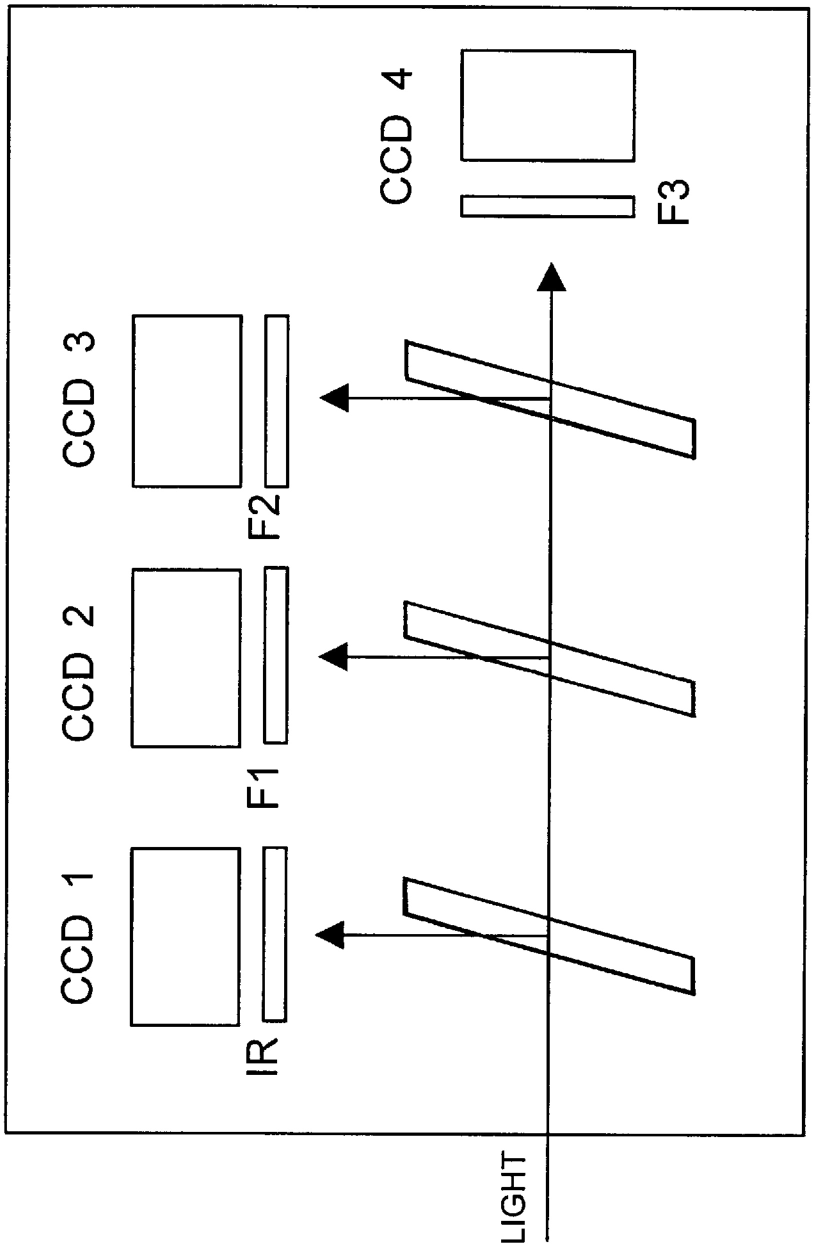
FIG. 6 is a diagrammatic view of a further embodiment of a camera or sensor for the control system of the present invention.

Another embodiment of the camera or sensor 22 of the present invention is illustrated in FIG. 6, in which like reference numerals designate like parts. In this embodiment, the camera or sensor 22 has a beam splitter in order to separate the incoming light reflected from the printed material into an infrared beam for a first CCD 1, $F_1$ such as red for a second CCD 2, $F_2$ such as green for a third CCD 3, and $F_3$ such as blue for a fourth CCD. In this embodiment, suitable prisms, lenses, or mirrors may be utilized to accomplish the beam splitting of light in order to obtain the desired color attributes in the various charge coupled devices to supply the information to the computer 30 for storage and processing in the computer 30, in a manner as previously described. Of course, any other suitable camera or sensing device may be utilized to obtain the desired colors.

Thus, in accordance with the present invention, a control system 10 for a printing press 11 is provided which ascertains three distinct attributes, such as colors, in the visible region of electromagnetic waves and an attribute in the infrared region of the electromagnetic spectrum for the printed inks. The control system 10 utilizes these four attributes in a four channel device to indicate and control the ink colors for use in the press 11.

Thus, in accordance with the present invention, the colors may be sensed from a sheet taken during a current press run, and from a sheet taken during a reference press run, after which the sensed information is utilized in order to modify ink settings of a press 11 in order to obtain repeatability of the same colors from the reference run to the current press run. In this manner, a consistent quality of colors may be maintained by the printing press 11 irrespective of the number of runs after the reference run has been made, and may be continuously used during a press run if desired.

The foregoing detailed description has been given for clearness of understanding only, and no unnecessary limitations should be understood therefrom, as modifications will be obvious to those skilled in the art.

What is claimed is:

1. A control system for a four-color printing press, comprising:

means for detecting energy reflected from a paper surface in both a visible region and an infrared region of the electromagnetic spectrum, the detecting means having an output;

means for converting the output of the detecting means to a set of variables which represent the amount of cyan, magenta, yellow, and black ink present on the paper;

means responsive to the converting means for adjusting the four-color printing press to maintain color consistency, the detecting means having at least four separate channels, at least three of said channels being adapted to sense energy in the visible region of the electromagnetic spectrum and at least one of said channels being operable to sense energy in the infrared region of the electromagnetic spectrum;

a first set of elements corresponding to the output of the detecting means in a sensor space;

a second set of elements representing the amount of ink present in a given area in an ink space;

a reverse transfer function for transforming the first set of elements in the sensor space into the second set of elements in the ink space; and, a forward transfer function for transforming the second set of elements in the ink space to the first set of elements in the sensor space.

2. A control system for a four-color printing press, comprising:

means for detecting the energy reflected from the paper surface in both the visible region and the infrared region of the electromagnetic spectrum;

means for converting the output of the detecting means to a set of variables which represent the amount of ink present on the paper for any of the cyan, magenta, yellow and black inks; and means responsive to the converting means for adjusting the four-color printing press to maintain the color consistency, said adjusting means being responsive to ink volume transferred into an ink zone from two adjacent ink zones.

3. A control system for a four-color printing press, comprising:

means for detecting energy reflected from a paper surface in both the visible region and the infrared region of the electromagnetic spectrum and for developing an output representative of the detected energy;

means for converting the output of the detecting means to a set of variables which represent the amount of ink present on the paper for any of the cyan, magenta, yellow and black inks, the output of said converting means reflecting dot gain and trapping between inks; and means responsive to the converting means for adjusting the tour-color printing press to maintain color consistency.

4. The system of claim 3 wherein the reflected energy in the infrared region has wavelengths between 800 nm and 1100 nm.

5. The system of claim 3 wherein the energy reflected in the infrared region has wavelengths longer than 1100 nm.

6. The system of claim 3 wherein the energy reflected in the visible region has attributes of red, green, and blue.

7. The system of claim 3 wherein the energy reflected in the visible region has attributes of cyan, magenta, and yellow.

8. The system of claim 3 wherein the output from the detecting means comprises a plurality of elements comprising vectors in a sensor space.

9. The system of claim 8 wherein the plurality of elements in the sensor space include first elements defining vectors designating an image from a reference copy and second elements defining vectors designating an image from a live copy.

10. The system of claim 8 including means for comparing first elements developed by the detecting means and corresponding to an image from a reference copy with second elements developed by the detecting means and corresponding to an image from a live copy.

11. The system of claim 10 including means for accepting the live copy from the sensor space when the difference between the first and second elements is within a predetermined limit at least for all channels in the visible region of the sensor space.

12. The system of claim 8 wherein the vectors in the sensor space are at least four dimensional.

13. The system of claim 3 including a set of elements in an ink space representing the amount of ink present in a given area.

14. The system of claim 13 wherein the elements in the ink space comprise a plurality of four dimensional vectors.

15. The system of claim 14 wherein the elements represent the inks associated with a reference copy and the inks associated with a live copy.

16. The control system of claim 13 wherein the ink space comprises ink per area.

17. The control system of claim 16 wherein the ink space comprises ink volume, average ink film thickness, or dot size.

18. The system of claim 3 including means for calculating a difference between elements representing a live image and elements representing a reference image in ink space.

19. The system of claim 18 wherein the adjusting means is responsive to the difference between the live and reference images in the ink space.

20. The system of claim 3 in which the paper comprises a web of the press.

21. The system of claim 3 including means for determining two ink feed rate control factors for each ink zone of each ink.

22. The control system of claim 21, wherein said two ink feed rate control factors comprise a first factor representing an ink volume ratio between a production copy and a reference copy, and a second factor representing an ink volume transferred from two adjacent ink zones.

23. The control system of claim 22 wherein the adjusting means is responsive to the ink volume ratio between the production copy and the reference copy for each ink zone of each ink.

24. The control system of claim 22 wherein the adjusting means is responsive to the ink volume transferred into an ink zone from two adjacent ink zones for each ink zone of each ink.

25. The control system of claim 3 including a forward transfer function comprising a data look up table.

26. The control system of claim 3 including a reverse transfer function comprising a data look up table.

27. The control system of claim 3 including a forward transfer function comprising, $$r(c, m, y, k) = a_{10} + \sum_{i=1}^{N_1} (a_{1i} \times c^{e1i} m^{f1i} y^{g1i} k^{h1i}),$$

$$g(c, m, y, k) = a_{20} + \sum_{i=1}^{N_2} (a_{2i} \times c^{e2i} m^{f2i} y^{g2i} k^{h2i}),$$

$$b(c, m, y, k) = a_{30} + \sum_{i=1}^{N_3} (a_{3i} \times c^{e3i} m^{f3i} y^{g3i} k^{h3i}),$$

and $$Ir(c, m, y, k) = a_{40} + \sum_{i=1}^{N_4} (a_{4i} \times c^{e4i} m^{f4i} y^{g4i} k^{h4i}),$$

where, r(c,m,y,k), g(c,m,y,k), b(c,m,y,k), and Ir(c,m,y,k) are the reflectance of the red, green, blue and infrared spectrum, respectively, $N_1$, $N_2$, $N_3$ and $N_4$ are positive integers, and $N_1$, $N_2$ and $N_3$ are normally greater than 16, $a_{10}$, $a_{20}$, $a_{30}$, $a_{40}$, $a_{1i}$, $a_{2i}$, $a_{3i}$, and $a_{4i}$ are coefficients, $e_{1i}$, $f_{1i}$, $g_{1i}$ and $h_{1i}$ are non-negative integers and not equal to zero at the same time, $e_{2i}$, $f_{2i}$, $g_{2i}$ and $h_{2i}$ are non-negative integers and not equal to zero at the same time, $e_{3i}$, $f_{3i}$, $g_{3i}$ and $h_{3i}$ are non-negative integers and not equal to zero at the same time, and $e_{4i}$, $f_{4i}$, $g_{4i}$ and $h_{4i}$ are non-negative integers and not equal to zero at the same time, and c, m, y, and k are percentage of dot size for cyan, magenta, yellow and black inks, respectively.

28. The control system of claim 3 including a reverse transfer function comprising, $$c(r, g, b, Ir) = d_{10} + \sum_{i=1}^{P_1} (d_{1i} \times r^{s1i} g^{t1i} b^{u1i} Ir^{v1i}),$$

$$m(r, g, b, Ir) = d_{20} + \sum_{i=1}^{P_2} (d_{2i} \times r^{s2i} g^{t2i} b^{u2i} Ir^{v2i}),$$

$$y(r, g, b, Ir) = d_{30} + \sum_{i=1}^{P_3} (d_{3i} \times r^{s3i} g^{t3i} b^{u3i} Ir^{v3i}),$$

and $$k(r, g, b, Ir) = d_{40} + \sum_{i=1}^{P_4} (d_{4i} \times r^{s4i} g^{t4i} b^{u4i} Ir^{v4i}),$$

where, c(r,g,b,Ir), m(r,g,b,Ir), y(r,g,b,Ir) and k(r,g,b,Ir) are the equivalent dot size for cyan, magenta, yellow and black inks, respectively, $P_1$, $P_2$, $P_3$, and $P_4$ are positive integers, and $P_1$, $P_2$, and $P_3$ are normally greater than 16, $d_{10}$, $d_{20}$, $d_{30}$, $d_{40}$, $d_{1i}$, $d_{2i}$, $d_{3i}$, and $d_{4i}$ are coefficients, $s_{1i}$, $t_{1i}$, $U_{1i}$ and $V_{1i}$ are non-negative integers and not equal to zero at the same time, $s_{2i}$, $t_{2i}$, $U_{2i}$ and $V_{1i}$ are non-negative integers and not equal to zero at the same time, $s_{3i}$, $t_{3i}$, $u_{3i}$ and $V_{3i}$ are non-negative integers and not equal to zero at the same time, and $s_{4i}$, $t_{4i}$, $u_{4i}$ and $v_{4i}$ are non-negative integers and not equal to zero at the same time, and r, g, b and Ir are the reflectance of the red, green, blue and infrared spectrum, respectively.

29. The control system of claim 3 including a color test form comprising color patches representing the color of paper, the impurity of process inks, the dot gain for different dot sizes, or trapping effect.

30. A control system for a four-color printing press, comprising:

means for detecting the energy reflected from a paper surface in both the visible region and the infrared region of the electromagnetic spectrum;

means for converting the output of the detecting means to a set of variables which represent the amount of ink present on the paper for any of the cyan, magenta, yellow and black inks, said converting means including a set of multi-variable polynomials; and means responsive to the converting means for adjusting the four-color printing press to maintain the color consistency, said adjusting means including means for determining the amount of ink transferred between ink zones.

31. A control system for a four-color printing press, comprising:

means for detecting energy reflected from a paper surface in both the visible region and the infrared region of the electromagnetic spectrum and for developing an output representative of the detected energy;

means for converting the output of the detecting means to a set of variables which represent the amount of ink present on the paper for any of the cyan, magenta, yellow and black inks, the output of said converting means reflecting dot gain and trapping between inks; and means responsive to the converting means for adjusting the four-color printing press to maintain color consistency, said adjusting means being adapted to determine the amount of ink transferred between ink zones.

32. A control system for a four-color printing press, comprising:

means for detecting energy reflected from a paper surface in both a visible region and an infrared region of the electromagnetic spectrum, the detecting means having an output;

means for converting the output of the detecting means to a set of variables which represent the amount of cyan, magenta, yellow, and black ink present on the paper;

means for determining two ink feed rate control factors for each ink zone of each ink; and means responsive to the converting means and the determining means for adjusting the four-color printing press to maintain color consistency, the detecting means having at least four separate channels, at least three of said channels being adapted to sense energy in the visible region of the electromagnetic spectrum and at least one of said channels being operable to sense energy in the infrared region of the electromagnetic spectrum.

33. The control system of claim 32, wherein said two ink feed rate control factors comprise a first factor representing an ink volume ratio between a production copy and a reference copy, and a second factor representing an ink volume transferred from two adjacent ink zones.

34. A method for controlling the operation of a four-color printing press comprising the steps of:

providing a reference copy of an image to be printed;

measuring reference red, green, blue and infrared (RGBI) reflection values from the reference copy;

providing a production copy of the image as printed by the printing press;

measuring production RGBI reflection values from the production copy of the image;

comparing the production RGBI values to the reference RGBI values;

if the comparison reveals a difference between the production RGBI values and the reference RGBI values which is greater than a predetermined threshold amount, converting the production RGBI values into production CMYK ink values representative of the amount of ink present on the production copy, developing a ratio between the production CMYK ink values and reference CMYK ink values representative of the amount of ink present at corresponding locations on the reference copy, and adjusting the printing press to correct the difference based on the ratio; and, if the difference between the production RGBI values and the reference RGBI values is less than the predetermined threshold amount, accepting the production copy without converting the production RGBI values into production CMYK ink values representative of the amount of ink present on the production copy.

* * * * *

UNITED STATES PATENT AND TRADEMARK OFFICE
CERTIFICATE OF CORRECTION

PATENT NO. : 5,841,955

DATED : November 24, 1998

INVENTOR(S) : Xin xin WANG

It is certified that error appears in the above-identified patent and that said Letters Patent is hereby corrected as shown below:

| | |
|---|---|
| Col. 17, line 59 | after "...$t_{1i}$,", the term "$U_{1i}$" is incorrect. The correct term is -- $u_{1i}$--. |
| Col. 17, line 59 | after "...and", the term "$V_{1i}$" is incorrect. The correct term is -- $v_{1i}$ --. |
| Col. 17, line 61 | after "...$s_{2i}$, $t_{2i}$,", the term "$U_{2i}$" is incorrect. The correct term is -- $u_{2i}$ -- . |
| Col. 17, line 61 | after "...and", the term "$V_{1i}$" is incorrect. The correct term is -- $v_{2i}$ --. |
| Col. 17, line 63 | after "...$s_{3i}$, $t_{3i}$, $u_{3i}$ and", the term "$V_{3i}$" is incorrect. The correct term is -- $v_{3i}$ --. |

Signed and Sealed this

Twelfth Day of October, 1999

*Attest:*

Q. TODD DICKINSON

*Attesting Officer*

*Acting Commissioner of Patents and Trademarks*